United States Patent
Nilsson et al.

(10) Patent No.: US 10,757,715 B2
(45) Date of Patent: *Aug. 25, 2020

(54) FREQUENCY-SELECTIVE BEAM MANAGEMENT

(71) Applicant: Telefonaktiebolaget LM Ericsson (publ), Stockholm (SE)

(72) Inventors: Andreas Nilsson, Göteborg (SE); Sven Petersson, Sävedalen (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/404,224

(22) Filed: May 6, 2019

(65) Prior Publication Data

US 2019/0261384 A1    Aug. 22, 2019

Related U.S. Application Data

(63) Continuation of application No. 15/650,039, filed on Jul. 14, 2017, now Pat. No. 10,314,056.

(51) Int. Cl.
| | |
|---|---|
| *H04B 7/06* | (2006.01) |
| *H04B 7/08* | (2006.01) |
| *H04W 8/00* | (2009.01) |
| *H04W 16/28* | (2009.01) |
| *H04W 72/04* | (2009.01) |

(Continued)

(52) U.S. Cl.
CPC .......... *H04W 72/12* (2013.01); *H04B 7/0617* (2013.01); *H04B 7/088* (2013.01); *H04W 8/005* (2013.01); *H04W 16/28* (2013.01); *H04W 72/046* (2013.01); *H04B 7/0408* (2013.01)

(58) Field of Classification Search
USPC ....................................................... 455/63.4
See application file for complete search history.

(56) References Cited

U.S. PATENT DOCUMENTS

| | | | | |
|---|---|---|---|---|
| 2017/0012692 A1* | 1/2017 | Kim | ...................... | H04B 7/0695 |
| 2017/0272223 A1* | 9/2017 | Kim | ...................... | H04B 7/0617 |

(Continued)

FOREIGN PATENT DOCUMENTS

| | | |
|---|---|---|
| EP | 2 045 944 A1 | 4/2009 |
| WO | 2016/050305 A1 | 4/2016 |
| WO | 2017/012803 A1 | 1/2017 |

OTHER PUBLICATIONS

International Search Report and Written Opinion issued in International Application No. PCT/EP2018/060539, dated Jul. 11, 2018, 16 pages.

*Primary Examiner* — Ganiyu A Hanidu
(74) *Attorney, Agent, or Firm* — Rothwell, Figg, Ernst & Manbeck, P.C.

(57) ABSTRACT

A method performed by a user equipment (UE) is provided. The method includes selecting a first beam for a first frequency band and selecting a second beam for a second frequency band. The method further includes receiving scheduling information (SI) for scheduling at least one of an uplink (UL) transmission from the UE and a downlink (DL) transmission to the UE. The SI includes frequency information identifying a frequency band. The method further includes selecting a beam from a set of beams including the first and second beams. The selection is based on the identified frequency band.

23 Claims, 8 Drawing Sheets

(51) Int. Cl.
*H04W 72/12* (2009.01)
*H04B 7/0408* (2017.01)

(56) References Cited

U.S. PATENT DOCUMENTS

| | | | | |
|---|---|---|---|---|
| 2017/0303263 A1* | 10/2017 | Islam | .................. | H04B 7/0408 |
| 2017/0331670 A1* | 11/2017 | Parkvall | ............... | H04J 11/0079 |
| 2017/0339675 A1* | 11/2017 | Liu | ...................... | H04L 5/0051 |
| 2018/0042000 A1* | 2/2018 | Zhang | ..................... | H04B 7/04 |
| 2018/0199328 A1* | 7/2018 | Sang | .................. | H04W 72/048 |

* cited by examiner

FREQUENCY-SELECTIVE BEAM MANAGEMENT

CROSS-REFERENCE TO RELATED APPLICATIONS

This application is a continuation of U.S. application Ser. No. 15/650,039, filed on Jul. 14, 2017 (published as U.S. 20190021096). The above identified application and publication are incorporated by this reference.

TECHNICAL FIELD

Disclosed are embodiments related generally to beam management, and more specifically to frequency-selective beam management.

BACKGROUND

The next generation mobile wireless communication system, which is referred to as "5G," will support a diverse set of use cases and a diverse set of deployment scenarios. 5G will encompass an evolution of today's 4G networks and the addition of a new, globally standardized radio-access technology known as "New Radio" (NR).

The diverse set of deployment scenarios includes deployment at both low frequencies (100s of MHz), similar to LTE today, and very high frequencies (mm waves in the tens of GHz). At high frequencies, propagation characteristics make achieving good coverage challenging. Narrow-beam transmission and reception schemes will be needed at higher frequencies to compensate for the corresponding high propagation loss. For a given communication link, a beam can be applied at both the transmission and reception point (TRP) and the user equipment (UE). The combination of a beam at the TRP and a beam at the UE is referred to here as a beam pair link (BPL). The task of the beam management procedure is to discover and maintain beam pair links.

Figure 1:
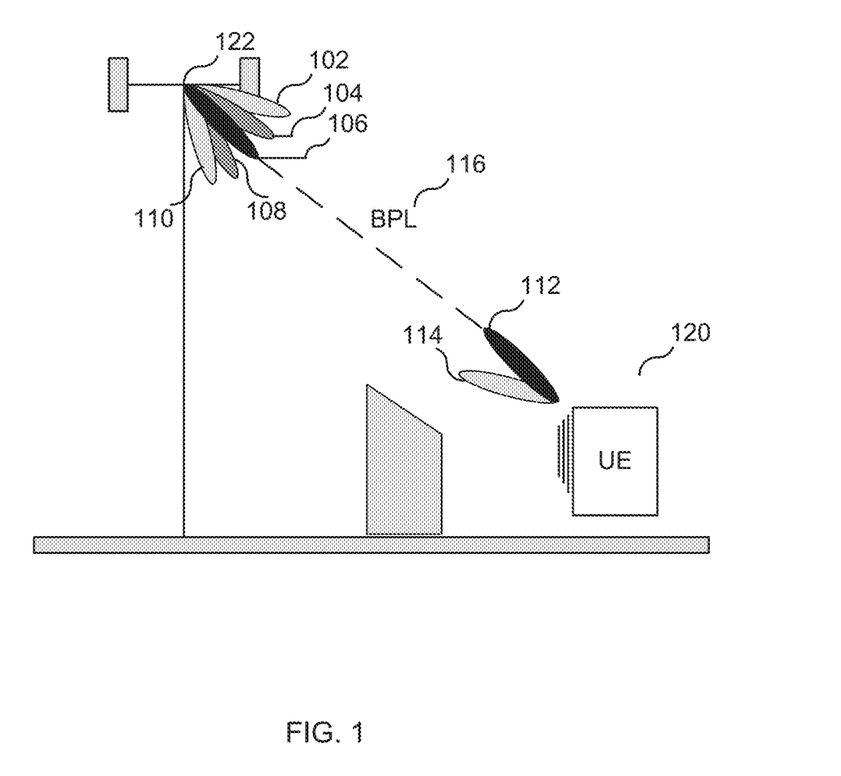
FIG. 1 illustrates beam management according to some embodiments.

In the example illustrated in FIG. 1, a BPL 116 has been discovered and is being maintained by the network. A BPL between TRP 122 and UE 120 (here including both the TRP beam 106 and UE beam 112) is expected to be discovered and monitored by the network using measurements on downlink reference signals used for beam management, e.g., CSI-RS (CSI-RS has been agreed in 3GPP as beam reference signal for New Radio (NR)). The CSI-RS for beam management can be transmitted periodically, semi-persistently, or aperiodically (e.g., event triggered) and they can be either shared between multiple UEs or be UE-specific. In order to find a suitable TRP beam (e.g., among TRP beams 102, 104, 106, 108, 110) the TRP 122 transmits CSI-RS in different TRP transmit (TX) beams on which the UE performs Reference Signal Received Power (RSRP) measurements and reports back the N best TRP TX beams (where N can be configured by the network). Furthermore, the CSI-RS transmission on a given TRP beam can be repeated to allow the UE 120 to evaluate suitable UE receive (RX) beams (e.g., among UE beams 112, 114). For each BPL, the UE 120 remembers the best UE RX beam, and whenever the TRP 122 transmits signals in a given BPL, the UE 120 applies the corresponding UE RX beam.

Figure 2:
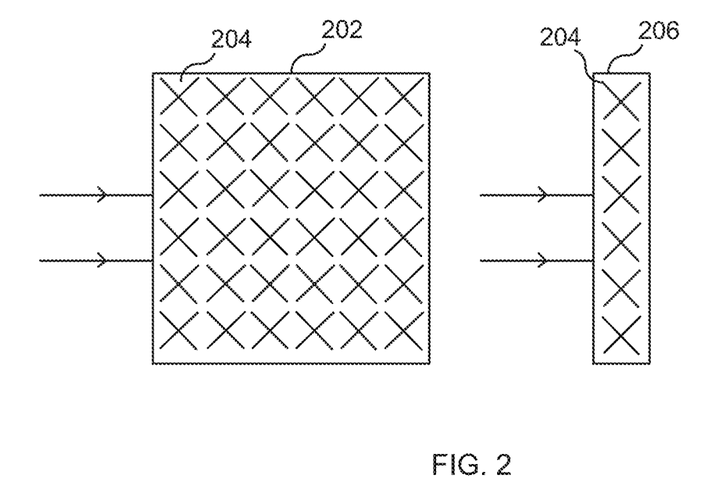
FIG. 2 illustrates beamforming antenna architecture according to some embodiments.

There are basically three different implementations of beamforming, applicable both at the TRP and at the UE: analog beamforming, digital beamforming, and hybrid beamforming. Each implementation has its pros and cons. Digital beamforming is the most flexible solution but also the costliest due to the large number of required radios and baseband chains. Analog beamforming is the least flexible but cheaper to manufacture due to reduced number of radio and baseband chains. Hybrid beamforming is a compromise between the analog and digital beamforming. One type of beamforming antenna architecture that has been agreed to study in 3GPP for the NR access technology is the concept of antenna panels, both at the TRP and at the UE. A panel is an antenna array of dual-polarized elements with typically one transmit/receive unit (TXRU) per polarization. An analog distribution network with phase shifters is used to steer the beam of each panel. FIG. 2 illustrates two examples of panels 202, 206 (a two-dimensional panel 202 to the left and one-dimensional panel 206 to the right, having dual-polarized elements 204), where each panel is connected to one TXRU per polarization.

It is expected that the phase and amplitude is known for each element within an analog array for both TX and RX, i.e. an analog array can be assumed to be calibrated. Hence, reciprocity can be used to find a good RX beam in case a good TX beam has been found, and vice versa.

The CSI-RSs for beam management are expected to cover the whole bandwidth in order to get a wideband sounding of the channel.

SUMMARY

Due to frequency selectivity in the channel, the optimal UE beam (e.g., the optimal UE RX beam) might be different for different parts of the frequency band. Hence, depending on which frequency band the UE is scheduled in, different UE beams might be optimal. Therefore only remembering one UE beam per BPL (i.e., the UE beam that was best in average over the whole frequency band) will in many cases be sub-optimal.

Embodiments provide for a UE that (1) remembers a set of two or more UE beams (e.g., RX or TX beams) for at least one BPL, where each UE beam is the best UE beam for a certain part of the frequency band, according to some channel quality metric (e.g., RSRP measurements); and selects a UE beam out of the set of UE beams based on one or more of (i) which frequency band the UE is scheduled in, and (ii) a channel quality of the beams.

One advantage of some embodiments is that the selected UE beam (e.g., UE RX beam) is particularly well-adapted to the frequency band that the UE is scheduled in, which may improve performance of the scheduled uplink or downlink.

According to a first aspect, a method is provided. The method may be performed by a user equipment (UE). The method includes selecting a first beam for a first frequency band; and selecting a second beam for a second frequency band. The method further includes receiving scheduling information (SI) for scheduling at least one of an uplink (UL) transmission from the UE and a downlink (DL) transmission to the UE, the SI comprising frequency information identifying a frequency band. The method further includes selecting a beam from a set of beams including the first and second beams. The selection is based on the identified frequency band.

According to a second aspect, a user equipment is provided. The user equipment includes a receiver; a transmitter; a data storage system; and a data processing apparatus including a processor. The data processing apparatus is coupled to the data storage system, the transmitter, and the receiver, and the data processing apparatus is configured to select a first beam for a first frequency band; and select a second beam for a second frequency band. The data processing apparatus is further configured to receive scheduling information (SI) for scheduling at least one of an uplink (UL) transmission from the UE and a downlink (DL) transmission to the UE, the SI comprising frequency information identifying a frequency band. The data processing apparatus is further configured to select a beam from a set of beams including the first and second beams, wherein the selection is based on the identified frequency band.

According to a third aspect, a computer program product is provided. The computer program product includes a non-transitory computer-readable medium storing a computer program having computer code which, when run on processing circuitry of a user equipment (UE), causes the UE to select a first beam for a first frequency band; and select a second beam for a second frequency band. The computer code, when run on the processing circuitry of the UE, further causes the UE to receive scheduling information (SI) for scheduling at least one of an uplink (UL) transmission from the UE and a downlink (DL) transmission to the UE, the SI comprising frequency information identifying a frequency band. The computer code, when run on the processing circuitry of the UE, further causes the UE to select a beam from a set of beams including the first and second beams. The selection is based on the identified frequency band.

According to any of the aspects, additional embodiments are provided.

According to some embodiments, the first frequency band and the second frequency band may have equal size or they may have unequal size. In some embodiments, the first frequency band and the second frequency band are dynamically updated based at least in part on reference signal received power (RSRP) measurements. In these embodiments, a width of each of the first and second frequency bands and/or an overlap between the first and second frequency bands may be based on a coherency bandwidth such that bands are wider where the channel is varying slowly with frequency according to the channel quality measurements and bands are shorter where the channel is varying quickly with frequency according to the channel quality measurements. In some embodiments, the first frequency band and the second frequency band partially overlap.

In some embodiments, the method further includes selecting (or the data processing apparatus is further configured to select, or the computer code, when run on the processing circuitry of the UE, further causes the UE to select) a third beam for the whole frequency band, and wherein the set of beams further includes the third beam. In embodiments, the method may further include selecting (or the data processing apparatus is further configured to select, or the computer code, when run on the processing circuitry of the UE, further causes the UE to select) the third beam from the set of beams as a result of the identified frequency band misaligning with the first frequency band and the second frequency band. In embodiments, the method further includes selecting (or the data processing apparatus is further configured to select, or the computer code, when run on the processing circuitry of the UE, further causes the UE to select) the third beam from the set of beams as a result of a network node requesting the UE to signal back RSRP measurements.

In some embodiments, selecting a beam from the set of beams comprises determining to use the first beam as a result of determining that the identified frequency band lies substantially within the first frequency band. In embodiments, selecting a beam from the set of beams is further based on channel quality measurements.

In embodiments, the method further includes selecting (or the data processing apparatus is further configured to select, or the computer code, when run on the processing circuitry of the UE, further causes the UE to select) further beams for further frequency bands, such that the further frequency bands together with the first and second frequency band substantially cover the whole frequency band, and wherein the set of beams further includes the further frequency bands. In embodiments, the first beam and the second beam are each receive (RX) beams, and are each found during a UE RX beam training procedure. In some embodiments, the first beam and the second beam are selected for a first beam pair link. In these embodiments, the method may further include selecting (or the data processing apparatus is further configured to select, or the computer code, when run on the processing circuitry of the UE, further causes the UE to select) a third beam for a third frequency band and selecting a fourth beam for a fourth frequency band. In such embodiments, the third and fourth beams may be selected for a second beam pair link and may be included in the set of beams; and selecting the beam from the set of beams further includes identifying one of the first or the second beam pair link to use for the UL and/or DL transmissions.

BRIEF DESCRIPTION OF THE DRAWINGS

The accompanying drawings, which are incorporated herein and form part of the specification, illustrate various embodiments.

DETAILED DESCRIPTION

Figure 3A:
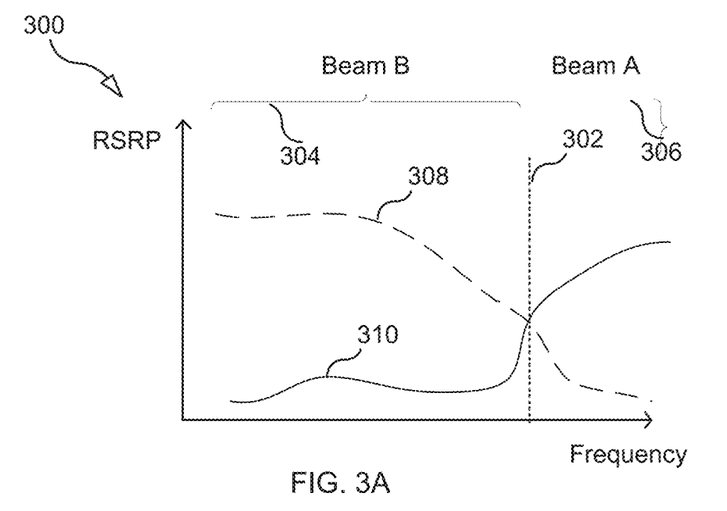
FIG. 3A is a graph showing a relationship between channel quality and frequency according to some embodiments.
Figure 3B:
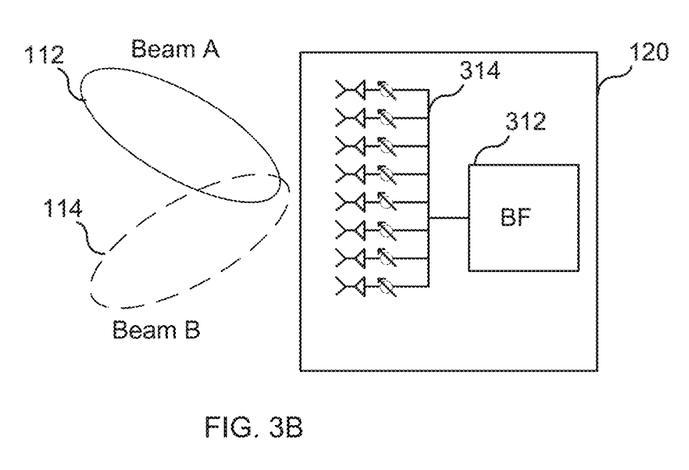
FIG. 3B is a schematic illustration of beamforming according to some embodiments.

FIG. 3A is a schematic illustration of frequency selectivity according to some embodiments. FIG. 3B is a schematic illustration of beamforming according to some embodiments. Referring now to FIGS. 3A-3B, a UE 120 has one analog array 314 that can generate two beams 112, 114 (a/k/a beam A and beam B), via beamformer (BF) 312. The graph 300 illustrates the RSRP measurements over the whole frequency band for each respective UE beam, attained for example during a UE RX beam training procedure. Curve 310 in FIG. 3A shows the RSRP/frequency relationship for beam A112 and curve 308 in FIG. 3A shows the RSRP/frequency relationship for beam B113. Line 302 divides the graph 300 into region 304 left of line 302 and region 306 right of line 302. As can be seen, the RSRP measurements vary over the frequency band for the respective beams and the best UE beam differs for different parts of the frequency band. For example, in region 304, beam B is best (RSRP measurements of curve 308 are consistently higher than for curve 310 in region 304), and in region 306, beam A is best (RSRP measurements of curve 310 are consistently higher than for curve 308 in region 306). "Best," as used here, means relative to a channel quality metric, where the metric illustrated is RSRP measurements. Other channel quality metrics may be used.

In the state of the art, only the best beam averaged over the whole frequency band would be stored by the UE (here, that would be beam B). However, as can be seen in graph 300, if the UE is scheduled for uplink or downlink in the right part of the frequency band (region 306), beam A would be a much more suitable choice than beam B. According to embodiments, UE 120 stores both beam A and beam B (i.e. the best UE beam for the respective part of the frequency band), and remembers in which part of the frequency band the respective beam was best. By storing a given beam, the UE may store beamforming parameter(s) needed to form the beam (e.g., beamforming weights, precoder matrix index, etc.), such that the beam can later be used by the UE for UL and/or DL transmissions where needed.

When the UE 120 is scheduled in a certain frequency band, the UE 120 may then evaluate which part of the frequency band matches best to the scheduled frequency band, and choose the corresponding UE beam (for example, the UE 120 can choose the UE beam corresponding to the part of the frequency band that has most overlap with the scheduled frequency band). Which beam that is used at the UE is transparent to the TRP, hence the UE 120 can change beams depending on which beam is the best for the scheduled transmission without informing the TRP 122 about the beam selection. In most cases, reciprocity is possible, and the selected UE beam can be used both for DL and UL (i.e. for reception (RX) and transmission (TX)). Where reciprocity does not obtain, UE 120 may remember different parameters for RX and TX beams.

Figure 4:
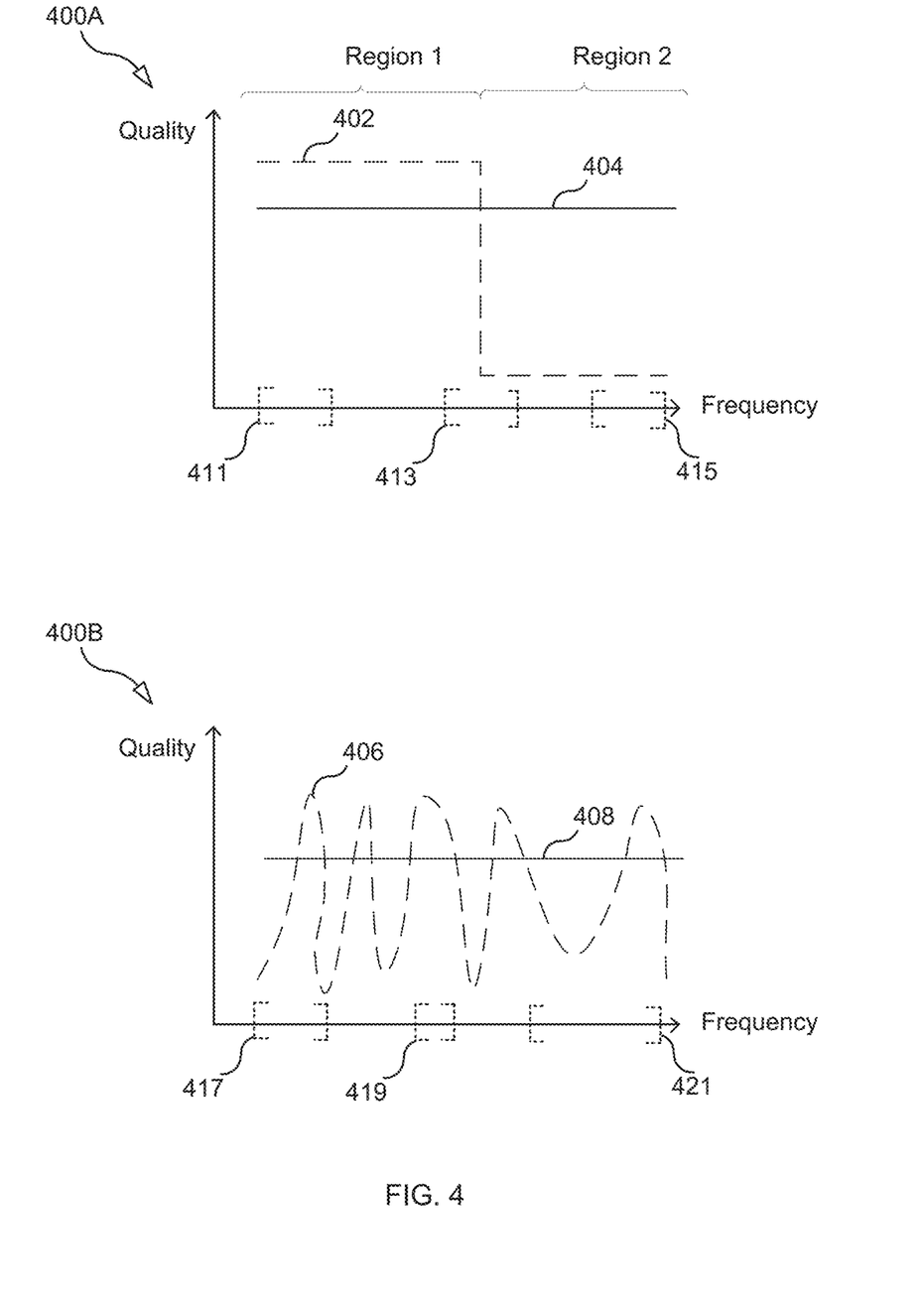
FIG. 4 includes two graphs each showing a relationship between channel quality and frequency according to some embodiments.

FIG. 4 is a schematic illustration of frequency selectivity according to some embodiments. FIG. 4 shows two graphs, 400A and 400B, that plot channel quality (e.g., RSRP measurements) against frequency. These graphs help to illustrate two separate points: (1) first, how frequency bands can be selected in which a best beam is remembered; (2) second, how a scheduled frequency band is matched (a/k/a aligned) with a beam for a given stored frequency band. Frequency bands may be predetermined and fixed, in which case selection does not need to occur following channel quality measurements. However, in some embodiments it is advantageous to select frequency bands based at least in part on such measurements. In either case, given a set of stored frequency bands, and a scheduled band for UL and/or DL, a beam from one of the stored frequency bands must be matched with a beam for the scheduled frequency.

In graph 400A, for example, curves 402 (representing beam B) and 404 (representing beam A) are relatively stable with respect to frequency. Curve 404 is essentially a line, where curve 402 is essentially two line segments with a point of discontinuity where channel quality abruptly drops. In other words, each channel is varying slowly (except at the point of discontinuity in curve 402). UE 120 may, in some embodiments, choose to remember beam B for the frequency band where curve 402 is stable and has higher quality (corresponding to region 1), and to remember the beam A for the frequency band where curve 404 is stable and has higher quality (corresponding to region 2). In embodiments, region 1 and region 2 may correspond to different bandwidths, or may have the same bandwidth. Selection of a given stored beam, as described above, may depend on the frequency band where an uplink or downlink is scheduled, as indicated by scheduling information (SI). For a scheduled frequency band 411, UE 120 may select the beam corresponding to curve 402, whereas for scheduled frequency band 415, UE 120 may select the beam corresponding to curve 404 (in each case, the scheduled frequency band lies completely or substantially within the respective stored frequency bands). For scheduled frequency band 413, however, the band straddles the stored frequency bands corresponding to regions 1 and 2. In some embodiments, UE 120 may select the beam corresponding to the one or other curve depending on the quality measurement (for example, based on average quality, or area under the curve, or some other function of quality over the scheduled frequency band). In some embodiments, UE 120 may determine that the scheduled frequency band 413 does not align with the stored frequency bands, and therefore may choose a default beam (e.g., having a best quality performance over the entire frequency range).

In graph 400B curve 408 (representing beam A) is relatively stable with respect to frequency, but curve 406 (representing beam B) is not and varies dramatically according to frequency. Curve 408 is essentially a line, where curve 406 is a sinusoidal type curve where channel quality experiences various peaks and troughs. In other words, whereas one channel is varying slowly, the other is varying quickly. UE 120 may, in some embodiments, choose to remember the beam corresponding to curve 406 at frequency bands where it is consistently higher in quality than the beam corresponding to curve 408 (represented by, essentially, the projection of the points on curve 406 that are higher than respective points on curve 408 projected to the frequency axis). As shown, these different remembered frequency bands may have different bandwidths. As described before, selection of a given stored beam may depend on a scheduled frequency band. For a scheduled frequency band 419, UE 120 may select the beam corresponding to curve 406 (since the scheduled frequency band lies completely or substantially within a peak of curve 406 corresponding to a stored frequency band). For scheduled frequency bands 417 and 421, however, the scheduled band straddles both a peak and a trough of curve 406. In some embodiments, UE 120 may select the beam corresponding to the one or other curve depending on the quality measurement (for example, based on average quality, or area under the curve, or some other function of quality over the scheduled frequency band). In some embodiments, UE 120 may determine that the scheduled frequency bands 417 and 421 do not align with the stored frequency bands, and therefore may choose a default beam (e.g., having a best quality performance over the entire frequency range).

Figure 5:
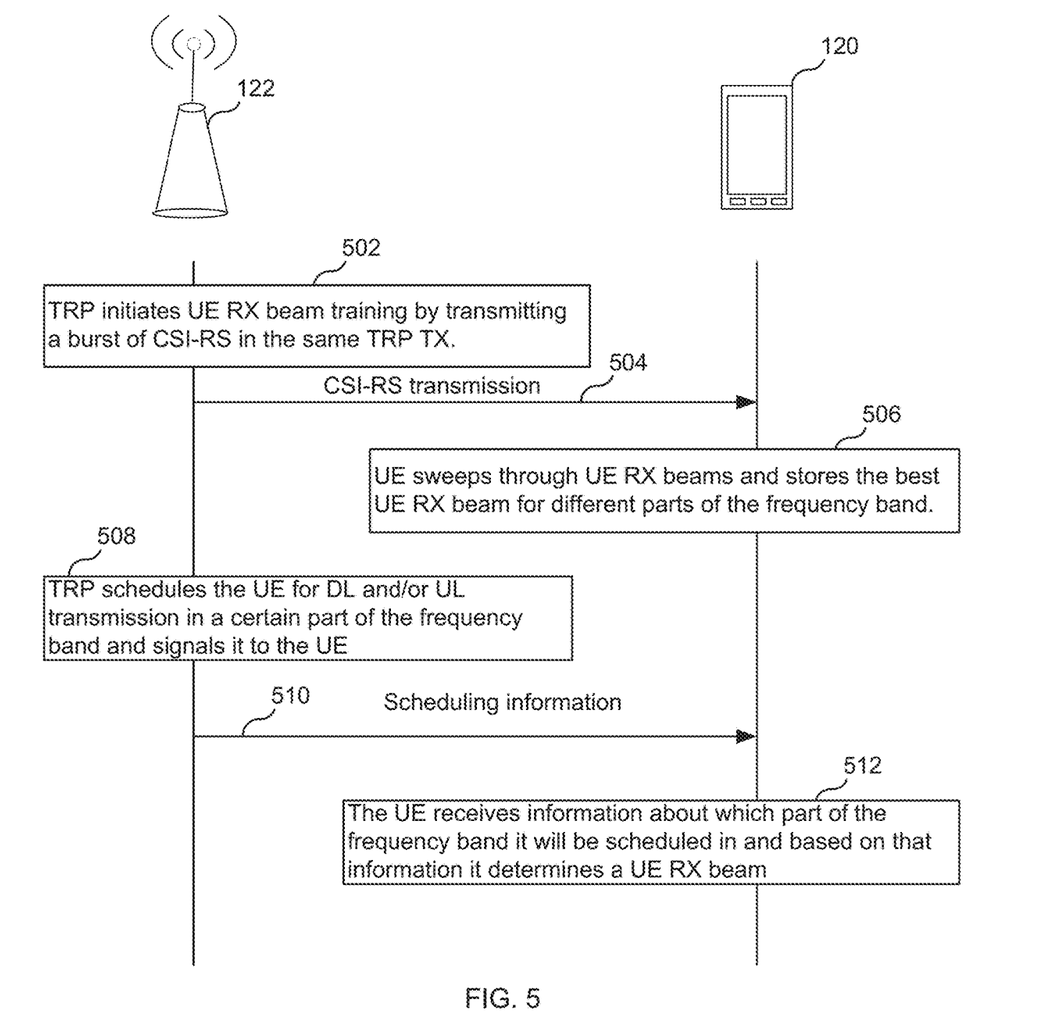
FIG. 5. is a message flow diagram illustrating a process according to some embodiments.

FIG. 5 illustrates a message flow diagram between TRP 122 and UE 120 according to embodiments. In the first step, the TRP 122 initiates (at 502) a UE RX beam training procedure by transmitting a burst of CSI-RS (at 504) in the same TRP TX beam. The UE 120 sweeps through the different UE RX beams while performing measurements (e.g., RSRP measurements) on the CSI-RSs (at 506). The UE determines the best UE RX beam for different parts of the frequency band and stores this information (at 506). The best UE RX beam can for example be determined based on highest RSRP measurement over a given part of the frequency band. The frequency band may be divided into different parts in a number of ways. For example, in one embodiment the different parts of the frequency band are pre-determined and fixed (e.g., bands 1, 2, . . . N each of size $n_1, n_2, \ldots n_N$; possibly overlapping and possibly having equal size). In another embodiment, the frequency sub-bands are dynamically determined depending on the current quality measurements (e.g., RSRP measurements). This method (dynamically determining bands) is more flexible and may lead to better alignment between the different parts of the frequency bands and the best UE RX beams. Further, dynamically determining bands will in some embodiments require only insignificantly more signal processing. In the next step, the TRP 122 schedules (at 508) the UE 120 in a certain frequency band for DL and/or UL and signals this information to the UE 120 (at 510). The UE 120 then chooses the UE beam based on which part of the frequency band the UE is scheduled in (at 512). If the UE is scheduled in different frequency bands for DL and UL, the UE can use different UE beams for DL and UL.

In one embodiment, the UE 120 stores the best beam for the respective part of the frequency band, and the best beam averaged over the whole frequency band. In this case, if the scheduled bandwidth does not match well with the different parts of frequency band, the UE 120 can choose the beam that is best over the whole frequency band.

In one embodiment, the different parts of the frequency bands may overlap with each other. For example, such overlapping may allow for finer granularity when matching stored bands to the scheduled frequency band.

In one embodiment, if the TRP 122 tells the UE 120 to signal back a quality of the link (e.g. an RSRP measurement) for the chosen UE RX beam, the UE 120 signals back the RSRP measurement for the beam that was best over the whole frequency band. However, the UE can switch to the best beam during upcoming scheduled UL and/or DL data transmissions for the scheduled frequency band in order to improve the link budget.

Figure 6:
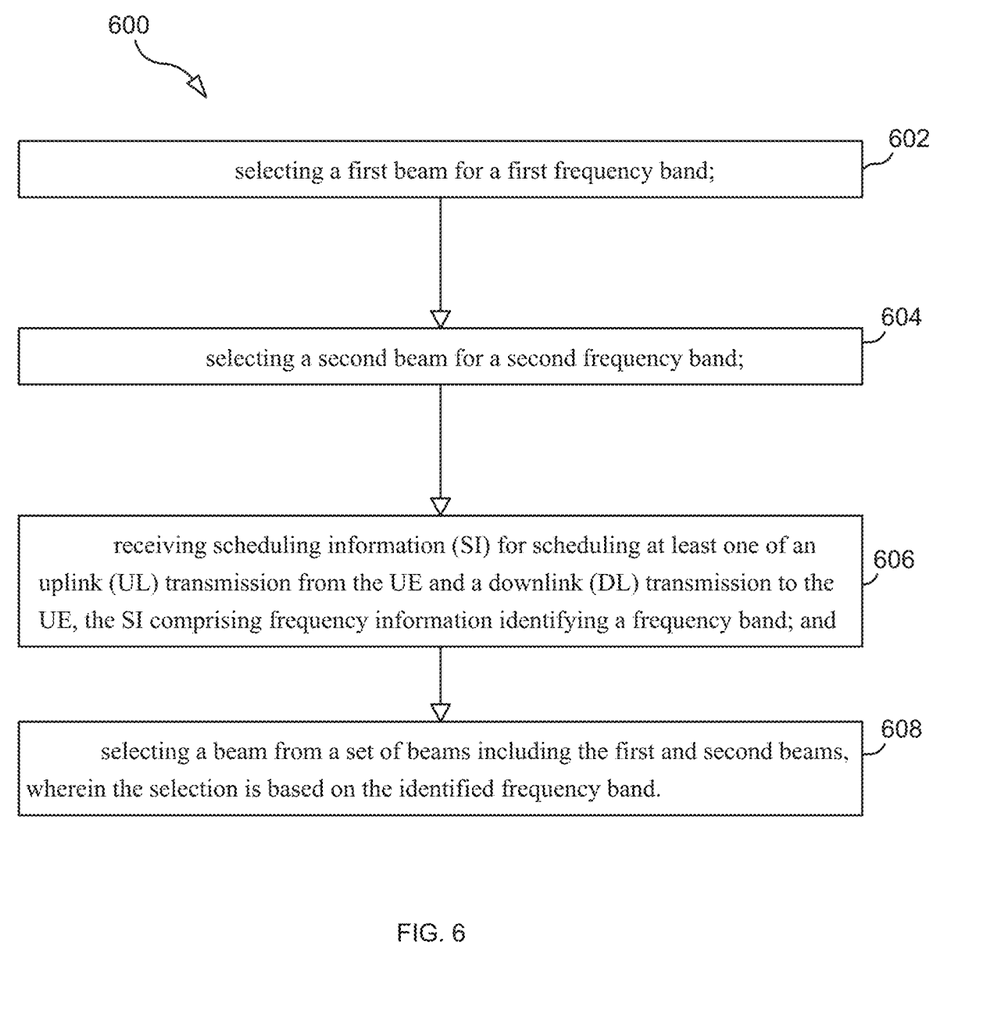
FIG. 6 is a flow chart illustrating a process according to some embodiments.

FIG. 6 illustrates a process 600 according to some embodiments. Process 600 may be performed by a user equipment (e.g., UE 120). The process includes selecting a first beam for a first frequency band (step 602). The process includes selecting a second beam for a second frequency band (step 604). The process includes receiving scheduling information (SI) for scheduling at least one of an uplink (UL) transmission from the UE and a downlink (DL) transmission to the UE, the SI comprising frequency information identifying a frequency band (step 606). The process includes selecting a beam from a set of beams including the first and second beams, wherein the selection is based on the identified frequency band (step 608).

According to some embodiments, the first frequency band and the second frequency band may have equal size or they may have unequal size. In some embodiments, the first frequency band and the second frequency band are dynamically updated based at least in part on reference signal received power (RSRP) measurements. In these embodiments, a width of each of the first and second frequency bands and/or an overlap between the first and second frequency bands may be based on a coherency bandwidth such that bands are wider where the channel is varying slowly with frequency according to the channel quality measurements and bands are shorter where the channel is varying quickly with frequency according to the channel quality measurements. In some embodiments, the first frequency band and the second frequency band partially overlap.

In some embodiments, the method further includes selecting a third beam for the whole frequency band, and wherein the set of beams further includes the third beam. In embodiments, the method may further include selecting the third beam from the set of beams as a result of the identified frequency band misaligning with the first frequency band and the second frequency band. In embodiments, the method further includes selecting the third beam from the set of beams as a result of a network node requesting the UE to signal back RSRP measurements.

In some embodiments, selecting a beam from the set of beams comprises determining to use the first beam as a result of determining that the identified frequency band lies substantially within the first frequency band. In embodiments, selecting a beam from the set of beams is further based on channel quality measurements.

In embodiments, the method further includes selecting further beams for further frequency bands, such that the further frequency bands together with the first and second frequency band substantially cover the whole frequency band, and wherein the set of beams further includes the further frequency bands. In embodiments, the first beam and the second beam are each receive (RX) beams, and are each found during a UE RX beam training procedure. In some embodiments, the first beam and the second beam are selected for a first beam pair link. In these embodiments, the method may further include selecting a third beam for a third frequency band and selecting a fourth beam for a fourth frequency band. In such embodiments, the third and fourth beams may be selected for a second beam pair link and may be included in the set of beams; and selecting the beam from the set of beams further includes identifying one of the first or the second beam pair link to use for the UL and/or DL transmissions.

Figure 7:
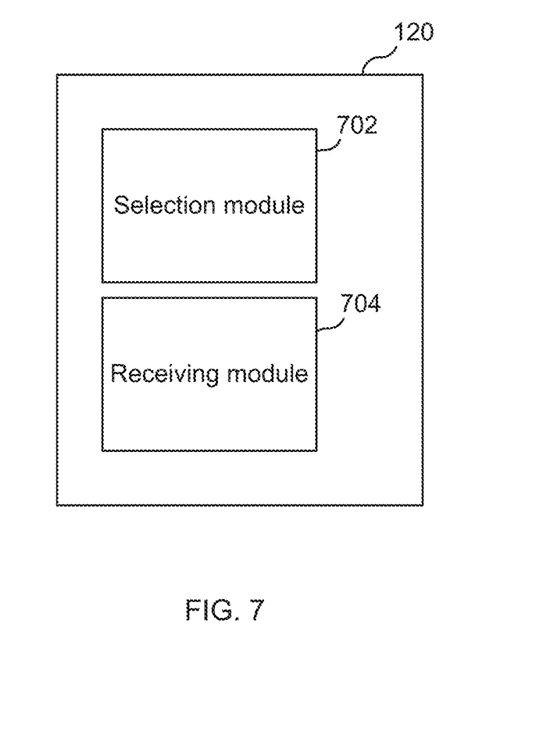
FIG. 7 is a diagram showing functional modules of a UE according to some embodiments.

FIG. 7 is a diagram showing functional modules of UE 120 according to some embodiments. As shown in FIG. 7, UE 120 includes a selection module 702 and a receiving module 704. Selection module 702 is configured to select a first beam for a first frequency band and to select a second beam for a second frequency band. Receiving module 704 is configured to receive scheduling information (SI) for scheduling at least one of an uplink (UL) transmission from the UE and a downlink (DL) transmission to the UE. The SI includes frequency information identifying a frequency band. Selection module 702 is further configured to select a beam from a set of beams including the first and second beams. The selection is based on the identified frequency band.

Figure 8:
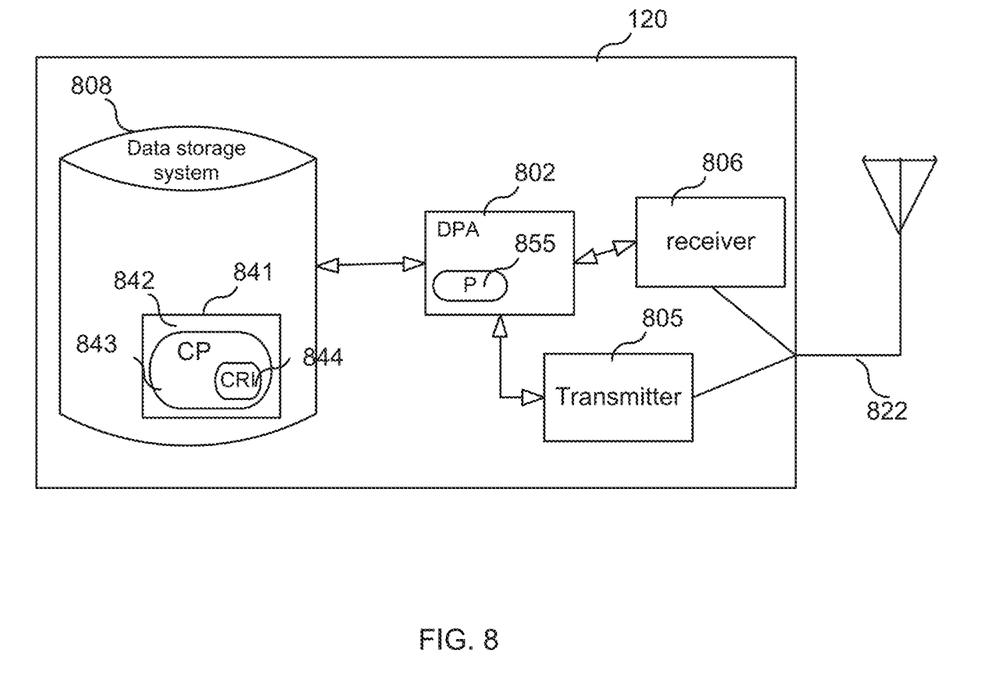
FIG. 8 is a block diagram of a UE according to some embodiments.

FIG. 8 is a block diagram of UE 120 according to some embodiments. As shown in FIG. 8, UE 120 may comprise: a data processing apparatus (DPA) 802, which may include one or more processors (P) 855 (e.g., a general purpose microprocessor and/or one or more other processors, such as an application specific integrated circuit (ASIC), field-programmable gate arrays (FPGAs), and the like); a transmitter 805 and a receiver 804 coupled to an antenna 822 for enabling UE 120 to transmit data to and receive data from an AN node (e.g., base station); and local storage unit (a.k.a., "data storage system") 808, which may include one or more non-volatile storage devices and/or one or more volatile storage devices (e.g., random access memory (RAM)). In embodiments where UE 120 includes a general purpose microprocessor, a computer program product (CPP) 841 may be provided. CPP 841 includes a computer readable medium (CRM) 842 storing a computer program (CP) 843 comprising computer readable instructions (CRI) 844. CRM 842 may be a non-transitory computer readable medium, such as, but not limited, to magnetic media (e.g., a hard disk), optical media, memory devices (e.g., random access memory), and the like. In some embodiments, the CRI 844 of computer program 843 is configured such that when executed by data processing apparatus 802, the CRI causes UE 120 to perform steps described above (e.g., steps described above with reference to the flow charts). In other embodiments, UE 120 may be configured to perform steps described herein without the need for code. That is, for example, data processing apparatus 802 may consist merely of one or more ASICs. Hence, the features of the embodiments described herein may be implemented in hardware and/or software.

While various embodiments of the present disclosure are described herein (including the appendices, if any), it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a user equipment (UE), the method comprising:
   selecting a first beam for a first frequency band;
   selecting a second beam for a second frequency band;
   receiving scheduling information (SI) for scheduling at least one of an uplink (UL) transmission from the UE and a downlink (DL) transmission to the UE, the SI comprising frequency information identifying a frequency band; and
   selecting a beam from a set of beams including the first and second beams, wherein the selection is based on the identified frequency band.

2. The method of claim 1, wherein the first frequency band and the second frequency band have equal size.

3. The method of claim 1, wherein the first frequency band and the second frequency band have unequal size.

4. The method of claim 1, wherein the first frequency band and the second frequency band are dynamically updated based at least in part on channel quality measurements.

5. The method of claim 4, wherein a width of each of the first and second frequency bands and/or an overlap between the first and second frequency bands is based on a coherency bandwidth such that bands are wider where the channel is varying slowly with frequency according to the channel quality measurements and bands are shorter where the channel is varying quickly with frequency according to the channel quality measurements.

6. The method of claim 1, wherein the first frequency band and the second frequency band partially overlap.

7. The method of claim 1, further comprising selecting a third beam for the whole frequency band, and wherein the set of beams further includes the third beam.

8. The method of claim 7, further comprising selecting the third beam from the set of beams as a result of the identified frequency band misaligning with the first frequency band and the second frequency band.

9. The method of claim 7, further comprising selecting the third beam from the set of beams as a result of a network node requesting the UE to signal back RSRP measurements.

10. The method of claim 1, wherein selecting a beam from the set of beams comprises determining to use the first beam as a result of determining that the identified frequency band lies substantially within the first frequency band.

11. The method of claim 1, wherein selecting a beam from the set of beams is further based on channel quality measurements.

12. The method of claim 1, further comprising selecting further beams for further frequency bands, such that the further frequency bands together with the first and second frequency band substantially cover the whole frequency band, and wherein the set of beams further includes the further frequency bands.

13. The method of claim 1, wherein the first beam and the second beam are each receive (RX) beams, and are each found during a UE RX beam training procedure.

14. The method of claim 1, wherein the first beam and the second beam are selected for a first beam pair link, and further comprising:
   selecting a third beam for a third frequency band;
   selecting a fourth beam for a fourth frequency band;
   wherein the third and fourth beams are selected for a second beam pair link and are included in the set of beams, and wherein selecting the beam from the set of beams further comprises identifying one of the first or the second beam pair link to use for the UL and/or DL transmissions.

15. The method of claim 1, wherein a beamformer used to form the selected beam is an analog beamformer.

16. The method of claim 1, wherein the selection of the first beam for the first frequency band is based on a channel quality measurement of the first beam for the first frequency band and the selection of the second beam for the second frequency band is based on a channel quality measurement of the second beam for the second frequency band.

17. The method of claim 16, wherein the selection of the first beam for the first frequency band is further based on the first beam having a higher channel quality measurement for the first frequency band as compared to other beams, and the selection of the second beam for the second frequency band is further based on the second beam having a higher channel quality measurement for the second frequency band as compared to other beams.

18. A user equipment comprising:
   a receiver;
   a transmitter;
   a data storage system; and
   a data processing apparatus comprising a processor, wherein the data processing apparatus is coupled to the data storage system, the transmitter, and the receiver, and the data processing apparatus is configured to:
   select a first beam for a first frequency band;
   select a second beam for a second frequency band;
   receive scheduling information (SI) for scheduling at least one of an uplink (UL) transmission from the UE and a downlink (DL) transmission to the UE, the SI comprising frequency information identifying a frequency band; and
   select a beam from a set of beams including the first and second beams, wherein the selection is based on the identified frequency band.

19. The UE of claim 18, wherein the first frequency band and the second frequency band are dynamically updated based at least in part on channel quality measurements.

20. The UE of claim 19, wherein a width of each of the first and second frequency bands and/or an overlap between the first and second frequency bands is based on a coherency bandwidth such that bands are wider when the channel is varying slowly with frequency according to the channel quality measurements and bands are shorter when the channel is varying quickly with frequency according to the channel quality measurements.

21. The UE of claim 18, wherein selecting a beam from the set of beams comprises determining to use the first beam as a result of determining that the identified frequency band lies substantially within the first frequency band.

22. The UE of claim 18, wherein selecting a beam from the set of beams is further based on channel quality measurements.

23. A computer program product comprising a non-transitory computer-readable medium storing a computer program comprising computer code which, when run on processing circuitry of a user equipment (UE), causes the UE to:
- select a first beam for a first frequency band;
- select a second beam for a second frequency band;
- receive scheduling information (SI) for scheduling at least one of an uplink (UL) transmission from the UE and a downlink (DL) transmission to the UE, the SI comprising frequency information identifying a frequency band; and
- select a beam from a set of beams including the first and second beams, wherein the selection is based on the identified frequency band.

* * * * *

UNITED STATES PATENT AND TRADEMARK OFFICE
CERTIFICATE OF CORRECTION

PATENT NO. : 10,757,715 B2  
APPLICATION NO. : 16/404224  
DATED : August 25, 2020  
INVENTOR(S) : Nilsson et al.

Page 1 of 1

It is certified that error appears in the above-identified patent and that said Letters Patent is hereby corrected as shown below:

In the Specification

In Column 1, Line 8, delete "2017" and insert -- 2017, now U.S. Pat. No. 10,314,056, --, therefor.

In Column 4, Line 61, delete "A112" and insert -- A 112 --, therefor.

In Column 4, Line 62, delete "B113." and insert -- B 113. --, therefor.

Signed and Sealed this  
Ninth Day of March, 2021

Drew Hirshfeld  
*Performing the Functions and Duties of the*  
*Under Secretary of Commerce for Intellectual Property and*  
*Director of the United States Patent and Trademark Office*